Nov. 10, 1964 A. A. VERDIBELLO 3,156,874

BIDIRECTIONAL MEMORY AND GATE SYNCHRONIZING CIRCUIT
FOR A VARIABLE FREQUENCY OSCILLATOR

Filed Dec. 16, 1960

INVENTOR
AMBROSE A. VERDIBELLO
BY [signature]
ATTORNEY

United States Patent Office 3,156,874
Patented Nov. 10, 1964

3,156,874

BIDIRECTIONAL MEMORY AND GATE SYNCHRONIZING CIRCUIT FOR A VARIABLE FREQUENCY OSCILLATOR

Ambrose A. Verdibello, Poughkeepsie, N.Y., assignor to International Business Machines Corporation, New York, N.Y., a corporation of New York Filed Dec. 16, 1960, Ser. No. 76,171
3 Claims. (Cl. 331—27)

This invention relates to improvements in variable frequency clocks such as those used, for example, in the gating and transmission of data in electronic data processing systems.

The invention has special application to variable frequency clocks used in electronic data processing systems for gating data from magnetic tape in to the processing system.

Improved data handling techniques have made it possible to read magnetic tape records at high speed, notwithstanding the fact that the density of such records may exceed 3000 bits per inch of tape track.

Characters recorded on magnetic tape are ordinarily represented in the binary notation wherein each character is represented by a combination of –1– and –0– bits. When the bits of a character are read from tape they are transmitted to a character register from which they are simultaneously gated into the data processing system by means of a gating pulse whose frequency is equal to the repetition rate of characters read from the tape. When the density of magnetic tape records is not great, no significant record gating problems are encountered. However, in systems adapted to the processing of records having a density sometimes in excess of 3000 bits per inch of tape track, difficult record gating problems are encountered. In order to insure that all of the bits of a character, and only the bits comprising a single character, are transmitted into the data processing system at each character cycle, use has been made of multi-character registers for receiving the tape recordings. A register system of this type is disclosed in United States Patent 2,921,296, granted January 12, 1960, on the application of Theodore G. Floros. Data can be gated through character registers such as those in the Floros patent by means of a timing device which produces gating pulses at a fixed frequency which matches the nominal rate at which characters are sensed on the tape provided the tape recorded records are at relatively low density. Any attempt to gate the characters of a dense record under control of a pulse appearing at a fixed frequency meets with the difficulty that even slight differences in the speed at which the tape is driven past the tape reading head will render the gating pulse frequency and the character repetition rate so non-synchronous as to make a constant frequency device unsuited for the purpose.

It has been proposed, therefore, to provide a variable frequency clock for producing timing pulses which vary according to variations in the rate at which characters are read from the tape. A clock designed for this purpose is disclosed in the application for United States Letters Patent, Serial No. 745,731, filed by Ernest G. Newman on June 30, 1958. In said Newman application, as in this application, the frequency of an oscillator is controlled by variations in its input voltage derived as a function of the tape character repetition rate. The oscillator output pulses initiate a saw-tooth wave which is compared with the arrival of the pulses coming from the tape. When the oscillator output is synchronized with the arrival of characters read from the tape, each –1– pulse from the tape will fall into the center of the saw-tooth wave. If the –1– pulses from the tape begin to appear before the center of the saw-tooth wave, it is an indication that the pulses are coming earlier, i.e., the tape speed is increased from its nominal speed. Under these conditions, frequency control voltage applied to the oscillator is made more negative such that its output frequency is increased to match the increased character repetition rate. Conversely, if the –1– pulses appear after the center of the saw-tooth wave, it is an indication that the pulses are coming later, i.e., that the tape speed has decreased. Under these conditions, the frequency control voltage applied to the oscillator is made more positive such that its output frequency is decreased to match the decreased character repetition rate.

The aforesaid Newman application embodies a balanced phase detector in which a pair of parallel bidirectional switches of the type described in "Wave Forms," volume 19 of the Radiation Laboratories Series, compare the incoming tape signals to the oppositely phased voltage of a saw-tooth wave produced by the output of the oscillator. In view of the extremely high operating condition imposed on the phase detector, it has been found very difficult to establish and maintain the necessary accurately matched balance in the component circuits.

It is, therefore, the primary purpose of this invention to provide a simple device which will accept oppositely phased tape signals and compare such signals with the saw-tooth wave form produced by the oscillator output and produce, in turn, an output signal which will show by its phase and amplitude the amount by which the tape signals arrive before or after the mid-point of the saw-tooth wave form.

It is a further object of this invention to provide a phase detector having a bidirectional memory which will serve to maintain the oscillator in synchronism with the speed of the tape even though there are no tape input pulses thereto for substantial intervals.

It is still a further object of this invention to provide a phase detecting device which eliminates parallel balanced circuits and which, therefore, does not require closely matched circuit components.

Yet a further object of this invention is the provision of a simple circuit which will produce a positive or negative output which accurately follows the input level in both the positive and negative directions.

Still a further object of this invention is to provide a circuit which will gate a saw-tooth wave form and a pulse together, such that the signal level presented at its output and at its memory element is determined by the level of the saw-tooth wave at the time of coincidence with the pulse.

Finally, it is the purpose of this invention to provide a circuit having a memory element which, in the absence of input pulses, will always restore to ground or zero potential from either the positive or the negative direction.

These and further objects and advantages of the invention will appear as the following description thereof is developed in light of the drawings forming a part hereof. In those drawings like reference numerals indicate like parts, and:

Figure 1:
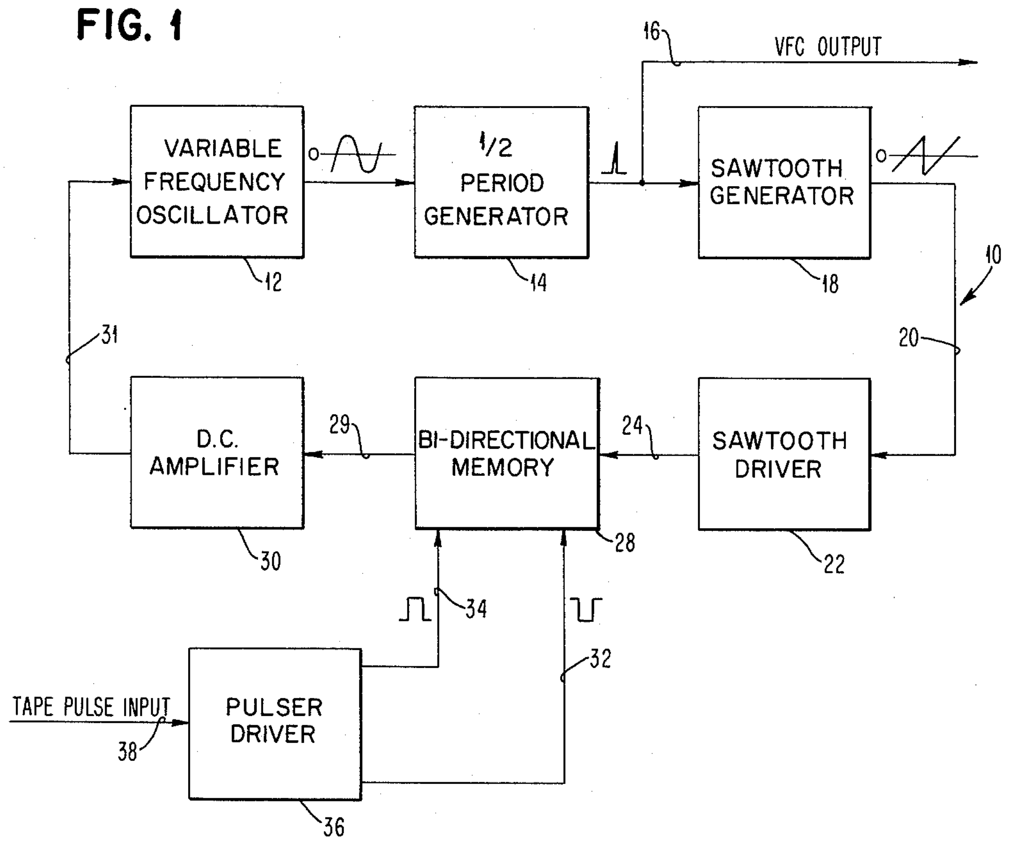
FIG. 1 is a block diagram of a variable frequency clock system.

In FIG. 1 the variable frequency clock 10 includes as its primary component a variable frequency oscillator 12 whose details are disclosed in the concurrent application for United States Letters Patent filed by Peter I. Prentky et al. The output of the variable frequency oscillator 12 is a sine wave which is fed to a half-period generator 14 which is in the nature of a blocking oscillator and wherein half-period pulses are generated at the time the sine wave passes from its minus voltage value to its plus. The output of the half-period generator on a line 16 is, therefore, a series of pulses having a frequency dependent on the frequency of the oscillator 12. These pulses are usefully employed as control pulses in an electronic data processing system or the like, as for example, character gating pulses as described above.

Figure 2:
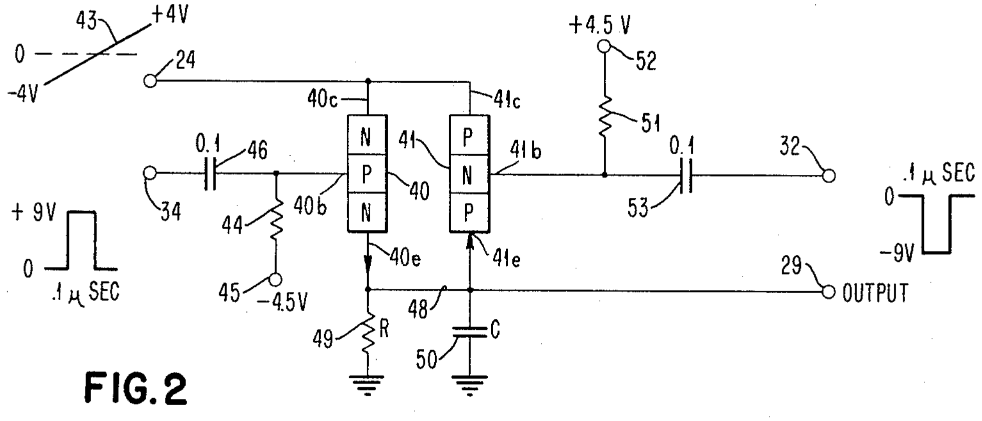
FIG. 2 is a diagram of the phase detector and memory circuit shown in the block diagram as the bidirectional memory.

The half-period pulses from the half-period generator 14 are also fed into a saw-tooth generator 18. The saw-tooth wave form on line 20 is fed into a saw-tooth driver 22 which lowers the impedance of the saw-tooth generator output and delivers it by way of a connection 24 to a bidirectional memory 28 in which the arrival of tape pulses are compared to the saw-tooth wave. The details of the bidirectional memory are shown in FIG. 2. A resultant voltage proportional to the position of the tape pulse along the saw-tooth wave is passed to an amplifier 30 via a line 29 and is delivered therefrom as a frequency control current via line 31 to the variable frequency oscillator 12.

The components of the variable frequency clock 10 find their functional counterpart in the aforesaid Newman patent application.

The bidirectional memory 28 with which this application is primarily concerned also has inputs 32 and 34 which connect the same to a pulser driver 36 which delivers to the inputs 32 and 34, respectively, the oppositely phased wave forms of pulses generated and detected from magnetic tape delivered to a tape pulse input line 38 which is connected to the pulser driver and by which the latter is energized.

The details of the bidirectional memory and gate 28 are shown in FIG. 2. This circuit in its broader aspect may be described as a sampler for detecting the magnitude at any particular time of an input signal which varies with time in either sense from a median value. In the particular circuit, the input wave form to be sampled is a saw-tooth wave form of 1.4 microsecond duration and its median value is zero volts. The circuit samples the potential of the saw-tooth wave form at a particular interval (of 0.1 microsecond duration) and stores that potential value on a capacitor for a much longer period. The primary requisite for operation as a sampler is that the driving ability of the voltage source to be sampled (at the common collector input) must be dominant over the sampling pulses at the input bases. From an impedance view point, the source impedance of the voltage wave form to be sampled must be many times lower than that of the sampling pulse. The collector is driven from cascaded emitter followers terminated with a complementary emitter follower, thus providing the low impedance needed. The sampling pulse generator must first provide complementary pulses with amplitudes capable of exceeding by at least 1 volt the most positive and negative excursions of the wave form to be sampled. It may nearly take the form of a paraphase amplifier.

The circuit includes an NPN transistor 40 having a collector electrode 40*c*, a base electrode 40*b* and an emitter electrode 40*e*. A PNP transistor 41 has a collector electrode 41*c*, a base electrode 41*b* and an emitter electrode 41*e*. The collectors 40*c* and 41*c* are connected together to the input terminal 24, to which the wave form 43 to be sampled is applied. The base electrode 40*b* is connected through a resistor 44 to the negative terminal 45 of a source of potential indicated as −4.5 volts. The base electrode 40*b* is also connected through a capacitor 46 to the input terminal 34 which periodically receives a positive-going square wave pulse varying between a ground potential of 0 volt and a signal potential of +9 volts.

The emitters 40*e* and 41*e* are connected to a conductor 48 which serves as a common junction for the emitters and which is connected through a resistor 49 and a capacitor 50 in parallel to ground.

Base electrode 41*b* is connected through a resistor 51 to the positive terminal 52 of a source of electrical potential indicated as +4.5 volts. Base electrode 41*b* is also connected through a capacitor 53 to the input terminal 32 which receives periodically a square wave clock pulse from the pulse driver 36 varying between a ground potential of 0 volt and a signal potential of −9 volts. The output terminal 29 is connected to the common junction wire 48.

In the absence of any input pulses at the terminals 32 and 34, the transistors 40 and 41 are both biased off by the potentials applied to the terminals 45 and 52.

The data pulses are supplied to the input terminals 32 and 34 simultaneously. Note that they are equal in magnitude and opposite in polarity. If the potential of the saw-tooth wave 43 is negative at the instant the pulses are applied, the collector-base impedance of transistor 40 is forwardly biased and the collector-base impedance of transistor 41 is reversely biased. A sufficient current flow is established through the transistor 41 to charge the capacitor 50. The potential drop between the collector 41*c* and emitter 41*e* is at this time negligible, so that the potential to which the capacitor 50 is charged is a measure of the potential of the saw-tooth wave.

On the other hand, if the saw-tooth wave potential is positive at the time the pulses are applied to terminals 32 and 34, then the collector-base impedance of the transistor 40 becomes reversely biased while the collector-base impedance of the transistor 41 is forwardly biased. Consequently, the transistor 40 becomes conductive and charges the capacitor 50 to a potential which is a reasonably accurate measure of the potential at input terminal 24.

When the data pulses are removed from the terminals 32 and 34, the capacitor 50 discharges toward ground potential through the resistor 49, which is selected to provide a time constant longer than the period of the saw-tooth wave. The resistor 49 is selected to retain the sample potential on the capacitor 50 for as long a time as may be necessary to use that potential at the ouptut terminal 29.

If the potential of the saw-tooth wave happens to be at 0 volt at the time the data pulses are applied, then neither of the transistors turns on, since both have emitter-collector potentials of zero. Consequently, the emitters will remain at zero potential and there will be zero volts across the capacitors 50. The average value of the potential at the input terminal 24 will have to depart from zero by an amount greater than the minimum collector-emitter drop across the transistor in order for a potential to be stored on the capacitor 50 at any particular sampling interval. This operation is well within the limits of accuracy required for the particular use to which this circuit is put in the present apparatus and is also well within the limits of accuracy required for many other installations of this circuit.

The following table gives values for various resistors and capacitors which have been used in one circuit which was operated successfully:

| | | |
|---|---|---|
| Resistor 44 | kilohms | 2 |
| Capacitor 46 | microfarad | 0.1 |
| Resistor 49 | megohm | 1 |
| Capacitor 50 | micromicrofarads | 500 |
| Resistor 51 | kilohms | 2 |
| Capacitor 53 | microfarad | 0.1 |

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. A sampler circuit for storing the value at particular intervals of an input signal varying with time and shiftable in opposite senses from a datum potential, comprising an NPN transistor, a PNP transistor, each transistor having collector, base and emitter electrodes, means connecting both collector electrodes together and to an input terminal to receive said signal varying with time, means connecting said emitters to a common junction, a capacitor and a parallel resistor connected in parallel between said common junction and a terminal maintained at said datum potential, means supplying to the base electrodes of the respective transistors biasing potentials tending to hold said transistors in a relatively non-conductive condition, and means effective during said particular intervals to supply to said base electrodes data pulse potentials effective to overcome said biasing potentials, said data pulse potentials varying in opposite senses and being effective to render one or the other of said transistors substantially conductive, depending upon the sense of the departure of said input signal from said datum potential, and thereby to charge said capacitor to a potential serving as a measure of the signal potential during said interval, and an output terminal connected to said common junction.

2. A sampler circuit for storing the value at particular intervals of an input saw-tooth waveform varying with time and shiftable in opposite senses from a datum potential, comprising an NPN transistor, a PNP transistor, each transistor having collector, base and emitter electrodes, means connecting both collector electrodes together and to an input terminal to receive said saw-tooth waveform varying with time, means connecting said emitters to a common junction, a capacitor and a parallel resistor connected in parallel between said common junction and a terminal maintained at said datum potential, means supplying to the base electrodes of the respective transistors biasing potentials tending to hold said transistors in a relatively non-conductive condition, and means effective during said particular intervals to supply to said base electrodes data pulse potentials effective to overcome said biasing potentials, said data pulse potentials varying in opposite senses and being effective to render one or the other of said transistors substantially conductive, depending upon the sense of the departure of said input saw-tooth waveform from said datum potential, and thereby to charge said capacitor to a potential serving as a measure of the saw-tooth waveform potential during said interval, and an output terminal connected to said common junction.

3. The sampler circuit of claim 1 in which a variable frequency oscillator is connected in circuit with the output and input terminals of said sampler circuit, and the charge on the capacitor is applied to the output terminal of said sampler circuit to regulate the frequency of said oscillator.

References Cited in the file of this patent

UNITED STATES PATENTS

| | | |
|---|---|---|
| 2,458,599 | Hussey | Jan. 11, 1949 |
| 2,799,784 | Harris et al. | July 16, 1957 |
| 2,820,143 | D'Nelly et al. | Jan. 14, 1958 |
| 3,012,182 | Ford | Dec. 5, 1961 |

FOREIGN PATENTS

| | | |
|---|---|---|
| 813,307 | Great Britain | May 13, 1959 |